US012266858B2

(12) United States Patent
Xie et al.

(10) Patent No.: US 12,266,858 B2
(45) Date of Patent: Apr. 1, 2025

(54) ANTENNA STRUCTURE, TERMINAL AND CONTROL METHOD

(71) Applicant: VIVO MOBILE COMMUNICATION CO., LTD., Guangdong (CN)

(72) Inventors: Yihua Xie, Guangdong (CN); Peng Huang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 506 days.

(21) Appl. No.: 17/568,524

(22) Filed: Jan. 4, 2022

(65) Prior Publication Data

US 2022/0131257 A1 Apr. 28, 2022

Related U.S. Application Data

(63) Continuation of application No. PCT/CN2020/098552, filed on Jun. 28, 2020.

(30) Foreign Application Priority Data

Jul. 10, 2019 (CN) ......................... 201910620534.7

(51) Int. Cl.
*H01Q 19/32* (2006.01)
*H01Q 3/44* (2006.01)
*H01Q 19/18* (2006.01)

(52) U.S. Cl.
CPC ............... *H01Q 19/32* (2013.01); *H01Q 3/44* (2013.01); *H01Q 19/18* (2013.01)

(58) Field of Classification Search
CPC .... H01Q 19/18; H01Q 19/30-32; H01Q 1/50; H01Q 5/378-392
See application file for complete search history.

(56) References Cited

U.S. PATENT DOCUMENTS 6,337,668 B1 * 1/2002 Ito .......................... H01Q 21/29 343/837
8,514,130 B1 8/2013 Jensen et al.
9,263,798 B1 2/2016 Piazza et al.
9,490,535 B2 11/2016 Boutayeb et al.
(Continued)

FOREIGN PATENT DOCUMENTS

CN 1534829 A 10/2004
CN 201213155 Y 3/2009
(Continued)

OTHER PUBLICATIONS

Extended European Search Report for European Patent Application No. 20837506.3 issued by the European Patent Office on Jul. 7, 2022.

(Continued)

*Primary Examiner* — Hasan Islam
(74) *Attorney, Agent, or Firm* — IP & T GROUP LLP

(57) ABSTRACT

An antenna structure includes a driven element and at least two parasitic elements. The at least two parasitic elements are disposed around the driven element and spaced apart from the driven element. Each parasitic element is provided with a switch control module, the switch control module has at least two switch statuses, and each of the switch statuses of the switch control module corresponds to one electrical length of the parasitic element.

12 Claims, 7 Drawing Sheets

(56) References Cited

U.S. PATENT DOCUMENTS

| | | | | |
|---|---|---|---|---|
| 2004/0027304 | A1 * | 2/2004 | Chiang | H01Q 3/446 343/810 |
| 2004/0061654 | A1 | 4/2004 | Webb et al. | |
| 2007/0210974 | A1 * | 9/2007 | Chiang | H01Q 19/32 343/757 |
| 2013/0069826 | A1 | 3/2013 | Wang et al. | |
| 2015/0365955 | A1 | 12/2015 | Liu et al. | |
| 2018/0019519 | A1 | 1/2018 | Liao et al. | |
| 2018/0083368 | A1 | 3/2018 | Teillet et al. | |
| 2019/0120931 | A1 | 4/2019 | Mihajlovic et al. | |
| 2019/0319354 | A1 | 10/2019 | Zhang et al. | |
| 2020/0274249 | A1 | 8/2020 | Cheng | |
| 2022/0029291 | A1 * | 1/2022 | Hayes | H01Q 21/205 |

FOREIGN PATENT DOCUMENTS

| | | | |
|---|---|---|---|
| CN | 202282453 | U | 6/2012 |
| CN | 104362437 | A | 2/2015 |
| CN | 105552575 | A | 5/2016 |
| CN | 106785359 | A | 5/2017 |
| CN | 107863605 | A | 3/2018 |
| CN | 108808242 | A | 11/2018 |
| CN | 109216895 | A | 1/2019 |
| CN | 109638411 | A | 4/2019 |
| CN | 110034400 | A | 7/2019 |
| CN | 110350306 | A | 10/2019 |
| EP | 3444897 | A1 | 2/2019 |
| JP | 2005-160011 | A | 6/2005 |
| WO | 2017/214997 | A1 | 12/2017 |
| WO | 2019/118241 | A1 | 6/2019 |

OTHER PUBLICATIONS

International Search Report and Written Opinion of International Application No. PCT/CN2020/098552 mailed on Aug. 27, 2020.

First Office Action of Priority Application No. CN 201910620534.7 mailed on May 20, 2020.

* cited by examiner

ANTENNA STRUCTURE, TERMINAL AND CONTROL METHOD

CROSS-REFERENCE TO RELATED APPLICATIONS

This application is a Bypass Continuation application of PCT/CN2020/098552 filed on Jun. 28, 2020, which claims priority to Chinese Patent Application No. 201910620534.7 filed on Jul. 10, 2019, which are incorporated herein by reference in their entirety.

TECHNICAL FIELD

The present disclosure relates to the field of communications technologies, and in particular, to an antenna structure, a terminal, and a control method.

BACKGROUND

The rapid development of radio communications technologies, especially the development of the 5th generation (5G) mobile communications technology, is bringing more and more abundant application scenarios for radio communications systems, and imposing higher requirements on antennas, which are one of the crucial components of the radio communications system. Data transmission application of terminals gradually focuses on high frequency, and an impact of directivity of high-frequency antennas on the performance of high-frequency transmission becomes more obvious. However, in current terminal antenna technologies, an antenna radiation pattern is difficult to be controlled by electrical scanning, and the directivity is relatively low.

SUMMARY

According to a first aspect, an embodiment of the present disclosure provides an antenna structure, including a driven element and at least two parasitic elements, where

- the at least two parasitic elements are disposed around the driven element and spaced apart from the driven element; and
- each parasitic element is provided with a switch control module, where the switch control module has at least two switch statuses, and each of the switch statuses of the switch control module corresponds to one electrical length of the parasitic element.

According to a second aspect, an embodiment of the present disclosure further provides a terminal, including the foregoing antenna structure.

According to a third aspect, an embodiment of the present disclosure further provides a control method, applied to the foregoing terminal. The method includes:

- determining a scanning direction in which scanning is to be performed by the antenna structure; and
- sending, based on the scanning direction, a control signal to a switch control module of a parasitic element in the antenna structure, where the control signal is used to control a switch status of the switch control module, so that the antenna structure performs electrical signal scanning in the scanning direction.

According to a fourth aspect, an embodiment of the present disclosure further provides a terminal, including the foregoing antenna structure. The terminal further includes:

- a determining module, configured to determine a scanning direction in which scanning is to be performed by the antenna structure; and
- a control module, configured to send, based on the scanning direction, a control signal to a switch control module of a parasitic element in the antenna structure, where the control signal is used to control a switch status of the switch control module, so that the antenna structure performs electrical signal scanning in the scanning direction.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

The technical solutions in embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
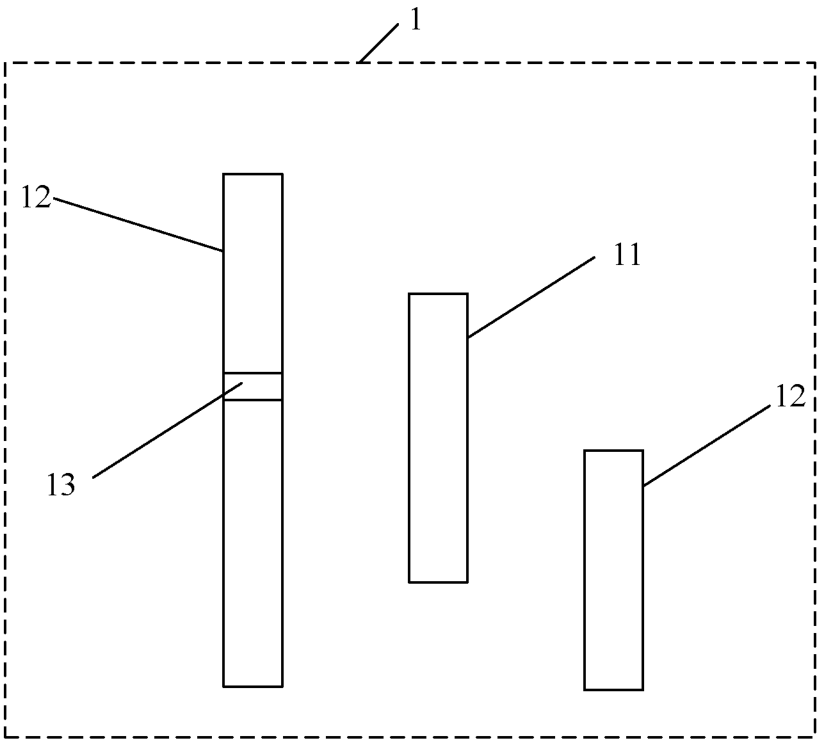
FIG. 1 is a schematic diagram of an antenna structure according to an embodiment of the present disclosure.

As shown in FIG. 1, an embodiment of the present disclosure provides an antenna structure 1, including a driven element 11 and at least two parasitic elements 12.

The at least two parasitic elements 12 are disposed around the driven element 11 and spaced apart from the driven element 11. That is, the at least two parasitic elements 12 are disposed near the driven element 11 and spaced apart from the driven element 11.

Each parasitic element 12 is provided with a switch control module 13. The switch control module 13 has at least two switch statuses, and each of the switch statuses of the switch control module 13 corresponds to one electrical length of the parasitic element 12. In this way, when the switch control module switches between different switch statuses, the parasitic element may have different electrical lengths.

Optionally, bottom ends of the parasitic elements 12 and the driven element 11 (such as lower ends of the parasitic element 12 and the driven element 11 in FIG. 1) may be in a same plane or different planes. For example, the bottom end of the driven element 11 may be higher than the bottom ends of all the parasitic elements 12 or lower than the bottom ends of all the parasitic elements 12; or the bottom end of the driven element 11 may be lower than bottom ends of some parasitic elements 12 but higher than bottom ends of other parasitic elements 12.

Certainly, top ends of the parasitic elements 12 and the driven element 11 (such as upper ends of the parasitic element 12 and the driven element 11 in FIG. 1) may be in a same plane or different planes. For example, the top end of the driven element 11 may be higher than the top ends of all the parasitic elements 12 or lower than the top ends of all the parasitic elements 12; or the top end of the driven element 11 may be lower than top ends of some parasitic elements 12 but higher than top ends of other parasitic elements 12.

For example, when the switch control module 13 is in a first switch status and an electrical length of the parasitic element 12 is in a first range when being as a reflector, the parasitic element 12 may serve as a reflector of the antenna structure 1; when the switch control module 13 is in a second switch status and the electrical length of the parasitic element 12 is in a second range when being as a director, the parasitic element 12 may serve as a director of the antenna structure 1.

In particular, the switch control module 13 may also have a plurality of first switch statuses and/or a plurality of second switch statuses, where electrical lengths, corresponding to the plurality of first switch statuses, of the parasitic element 12 are different from each other and each of the electrical lengths is within the first range, and electrical lengths, corresponding to the plurality of second switch statuses, of the parasitic element 12 are different from each other and each of the electrical lengths is within the second range.

Optionally, the parasitic elements 12 are frequency-doubled parasitic elements that meet a bandwidth resonance requirement.

Two parasitic elements are used as an example for description in the following.

Figure 2:
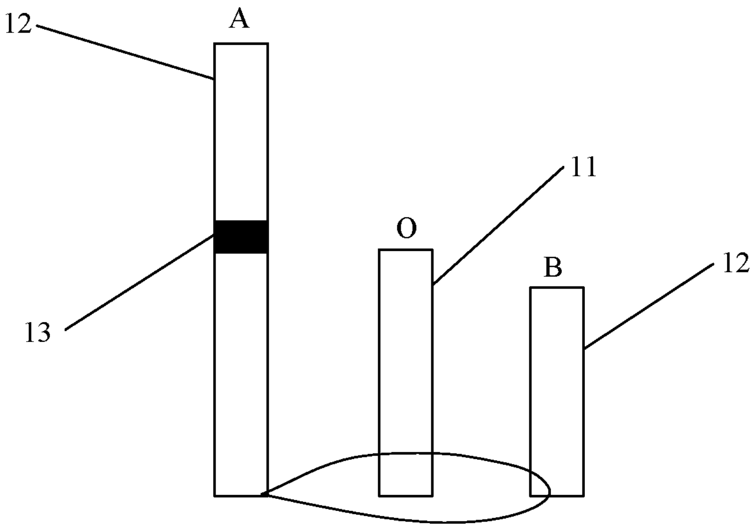
FIG. 2 is a first radiation pattern of an antenna structure according to an embodiment of the present disclosure.

As shown in FIG. 2, a parasitic element A and a parasitic element B are disposed near a driven element O, that is, the parasitic element A and the parasitic element B are disposed around the driven element O, and the parasitic element A and the parasitic element B are spaced apart from the driven element O.

Optionally, both the parasitic element A and the parasitic element B may be provided with a switch control module 13. When the switch control module 13 of the parasitic element A is in a first switch status, if an electrical length of the parasitic element A is in a first range, for example, the electrical length of the parasitic element A is greater than an electrical length of the driven element O, the parasitic element A serves as a reflector. When the switch control module 13 of the parasitic element B is in a second switch status (the switch control module in the second switch status is not shown in the figure), if an electrical length of the parasitic element B is in a second range, for example, the electrical length of the parasitic element B is smaller than the electrical length of the driven element O, the parasitic element B serves as a director. In other words, when a relationship between the electrical lengths of the parasitic element A, the parasitic element B, and the driven element O is A>O>B, a direction of the antenna effect pattern is extended toward B (as shown by the curve in FIG. 2).

Figure 3:
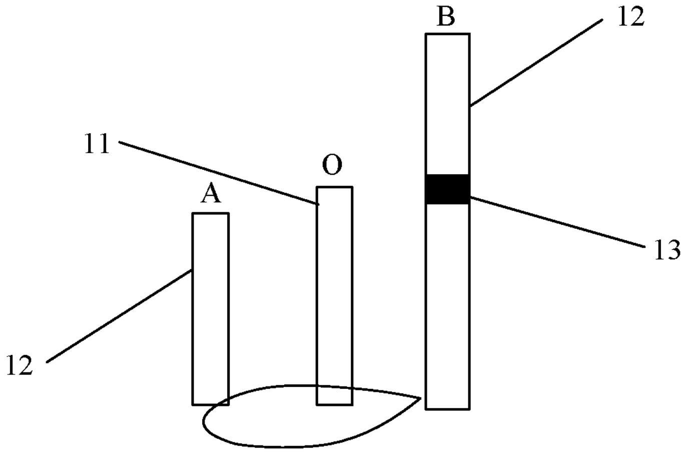
FIG. 3 is a second radiation pattern of an antenna structure according to an embodiment of the present disclosure.

As shown in FIG. 3, when the switch control module 13 of the parasitic element A is in the second switch status (the switch control module in the second switch status is not shown in the figure), if the electrical length of the parasitic element A is in the second range, for example, the electrical length of the parasitic element A is smaller than the electrical length of the driven element O, the parasitic element A serves as a director. When the switch control module 13 of the parasitic element B is in the first switch status, if the electrical length of the parasitic element B is in the first range, for example, the electrical length of the parasitic element B is larger than the electrical length of the driven element O, the parasitic element B serves as a reflector. In other words, when the relationship between the electrical lengths of the parasitic element A, the parasitic element B, and the driven element O is B>O>A, a direction of the antenna effect pattern is extended toward A (as shown by the curve in FIG. 3).

In this embodiment, at least two parasitic elements are disposed around a driven element and spaced apart from the driven element. Each parasitic element is provided with a switch control module. The switch control module has at least two switch statuses, and each of the switch statuses of the switch control module corresponds to one electrical length of the parasitic element. In this way, when the switch control module switches between different switch statuses, the parasitic element has different electrical lengths. Thus, an electrical length of the parasitic element can be adjusted by adjusting the switch status of the switch control module according to a scanning direction in which scanning is to be performed by an antenna structure, so that the parasitic element can meet a requirement of a director or reflector, and an antenna radiation pattern for electrical scanning is controlled along a circumferential plane, thereby improving the directional performance of the antenna structure.

Figure 4:
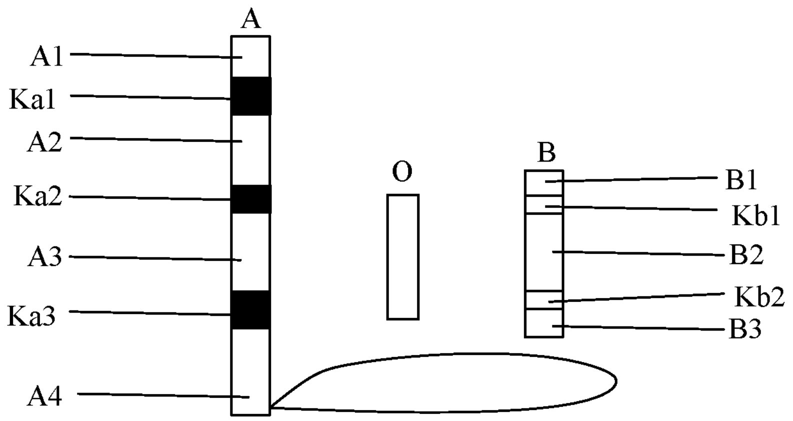
FIG. 4 is a first schematic diagram of a switch control module in an antenna structure according to an embodiment of the present disclosure.
Figure 5:
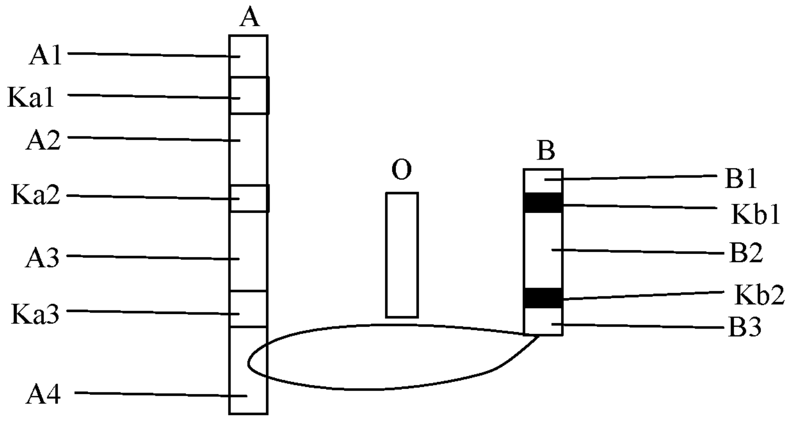
FIG. 5 is a second schematic diagram of a switch control module in an antenna structure according to an embodiment of the present disclosure.

As shown in FIG. 4 and FIG. 5, the switch control module 13 includes at least one switch element, and the parasitic element 12 includes at least two radiating elements.

The at least two radiating elements are sequentially connected, and one switch element is provided between every two adjacent radiating elements, where the switch element has an on state and an off state.

The switch status is a combination of an on state or an off state corresponding to each of the at least one switch element.

For example, the switch control module 13 includes N switch elements, where N is a positive integer. The parasitic element 12 includes N radiating components and one radiating element, where each radiating component includes a radiating element and a switch element connected to the radiating element.

The N radiating components are sequentially connected, and the one radiating element is connected to a switch element at the tail end of the N radiating components that are sequentially connected. Thus, the parasitic element formed by connection of the at least one switch element and the at least two radiating elements is a non-closed loop, that is, the parasitic element is arranged along a straight line or a zigzag line.

Optionally, the switch element is an electrical control switch.

It should be noted that quantities of switch elements in the switch control module 13 may be the same or different for different parasitic elements 12. That is, quantities of radiating elements may be the same or different for different parasitic elements 12. In a same parasitic element 12, arm lengths corresponding to the radiating elements may be the same or different.

Optionally, a quantity of the parasitic elements 12, and a quantity of radiating elements, arm length, and a quantity of switch elements that are in a parasitic element 12 may be set based on a direction in which scanning is to be performed by the antenna structure 1, radiation intensity, and the like. The present disclosure is not limited to those shown in the accompanying drawings.

Descriptions are provided below with reference to the drawings.

As shown in FIG. 4 and FIG. 5, a parasitic element A and a parasitic element B are disposed near a driven element O, that is, the parasitic element A and the parasitic element B are disposed around the driven element O, and the parasitic element A and the parasitic element B are spaced apart from the driven element O.

Optionally, the parasitic element A has radiating elements A1, A2, A3, and A4 and switch elements Ka1, Ka2, and Ka3. One switch element is connected between each group of two adjacent radiating elements. For example, the switch element Ka1 is connected between a first group of adjacent radiating elements A1 and A2; the switch element Ka2 is connected between a second group of adjacent radiating elements A2 and A3; and the switch element Ka3 is connected between a third group of adjacent radiating elements A3 and A4.

Optionally, the switch elements Ka1, Ka2, and Ka3 can be individually controlled, that is, the switch elements Ka1, Ka2, and Ka3 are independent of each other in terms of being in an off state or an on state. A switch status of the switch control module is a combination of an off/on state of each of the switch elements Ka1, Ka2, and Ka3. For example, the switch elements Ka1, Ka2, and Ka3 may be all turned off; the switch elements Ka1 and Ka2 are turned off, and the switch element Ka3 is turned on; the switch elements Ka1 and Ka3 are turned off, and the switch element Ka2 is turned on; the switch elements Ka1 and Ka2 are turned on, and the switch element Ka3 is turned off; the switch elements Ka2 and Ka3 are turned on, and the switch element Ka1 is turned off; or the switch elements Ka1, Ka2, and Ka3 are all turned on.

For example, when the switch elements Ka1, Ka2, and Ka3 are all turned off, an electrical length of the parasitic element A is an electrical length of the radiating element A3.

When Ka1 and Ka2 are turned off and Ka3 is turned on, the electrical length of the parasitic element A is an electrical length of the radiating elements A3 and A4.

When the switch elements Ka1 and Ka3 are turned off and Ka2 is turned on, the electrical length of the parasitic element A is an electrical length of the radiating elements A2 and A3.

When the switch elements Ka1 and Ka2 are turned on and Ka3 is turned off, the electrical length of the parasitic element A is an electrical length of the radiating elements A1, A2, and A3.

When the switch elements Ka2 and Ka3 are turned on and Ka1 is turned off, the electrical length of the parasitic element A is an electrical length of the radiating elements A2, A3, and A4.

When the switch elements Ka1, Ka2, and Ka3 are turned on, the electrical length of the parasitic element A is an electrical length of the radiating elements A1, A2, A3, and A4.

Optionally, the parasitic element B has radiating elements B1, B2, and B3 and switch elements Kb1 and Kb2. One switch element is connected to each group of two adjacent radiating elements. For example, the switch element Kb1 is connected between a first group of adjacent radiating elements B1 and B2, and the switch element Kb2 is connected between a second group of adjacent radiating elements B2 and B3.

Optionally, the switch elements Kb1 and Kb2 can be individually controlled, that is, the switch elements Kb1 and Kb2 are independent of each other in terms of being in an off state or an on state. A switch status of the switch control module is a combination of an off/on state of each of the switch elements Kb1 and Kb2. For example, the switch elements Kb1 and Kb2 are both turned off; the switch element Kb1 is turned off, and Kb2 is turned on; the switch element Kb1 is turned on, and Kb2 is turned off; or the switch elements Kb1 and Kb2 are both turned on.

For example, when the switch elements Kb1 and Kb2 are both turned off, an electrical length of the parasitic element B is an electrical length of the radiating element B2.

When the switch element Kb1 is turned off, and Kb2 is turned on, the electrical length of the parasitic element B is an electrical length of the radiating elements B2 and B3.

When the switch element Kb1 is turned on, and Kb2 is turned off, the electrical length of the parasitic element B is an electrical length of the radiating elements B1 and B2.

When the switch elements Kb1 and Kb2 are both turned on, the electrical length of the parasitic element B is an electrical length of the radiating elements B1, B2, and B3.

For example, in FIG. 4 and FIG. 5, a black switch element indicates a turned-on switch element, and a white switch element indicates a turned-off switch element. As shown in FIG. 4, the electrical length of the parasitic element A is greater than that of the driven element O, and the electrical length of the driven element O is greater than that of the parasitic element B. In this case, the antenna radiates in a direction toward the parasitic element B, and the radiation pattern is shown by the curve in FIG. 4. As shown in FIG. 5, the electrical length of the parasitic element A is less than that of the driven element O, and the electrical length of the driven element O is less than that of the parasitic element B. In this case, the antenna radiates in a direction toward the parasitic element A, and the radiation pattern is shown by the curve in FIG. 5.

Optionally, the parasitic elements 12 and the driven element 11 are encapsulated in a columnar structure.

The driven element 11 is located inside the columnar structure.

Some of the at least two parasitic elements 12 are located inside the columnar structure, while other parasitic elements are located on an outer peripheral surface of the columnar structure; or all of the at least two parasitic elements 12 are located on an outer peripheral surface of the columnar structure; or all of the at least two parasitic elements 12 are located inside the columnar structure.

That is, as an implementation, when the parasitic elements 12 and the driven element 11 are encapsulated in a columnar structure, the driven element 11 is located inside the columnar structure, and some of the at least two parasitic elements 12 are located inside the columnar structure, while other parasitic elements are located on the outer peripheral surface of the columnar structure. The parasitic elements 12 located inside the columnar structure needs to be disposed around the driven element 11 and spaced apart from the driven element 11, to ensure the radiation performance of the antenna.

As another implementation, when the parasitic elements 12 and the driven element 11 are encapsulated in a columnar structure, the driven element 11 is located inside the columnar structure, and all of the at least two parasitic elements 12 are located on the outer peripheral surface of the columnar structure, so that the parasitic elements 12 are disposed around the driven element 11 and spaced apart from the driven element 11, thereby ensuring the radiation performance of the antenna.

As yet another implementation, when the parasitic elements 12 and the driven element 11 are encapsulated in a columnar structure, the driven element 11 is located inside the columnar structure, and all of the at least two parasitic elements 12 are located inside the columnar structure. The parasitic elements 12 needs to be disposed around the driven element 11 and spaced apart from the driven element 11, to ensure the radiation performance of the antenna.

Optionally, the parasitic elements 12 and the driven element 11 are encapsulated in a columnar structure, to form a shape of the antenna structure, that is, the antenna may be in a columnar structure.

Optionally, the parasitic elements 12 located on the outer peripheral surface of the columnar structure may be formed by etching on the outer peripheral surface of the columnar structure.

Optionally, the columnar structure may be a cylindrical structure or a prism structure.

In this embodiment, the driven element 11 and the parasitic elements 12 are all encapsulated in a cylinder or prism, the driven element 11 is located inside the cylinder or a polygon (not necessarily at the central position of the cylinder or the prism), and the parasitic elements 12 are formed by etching on the periphery of the cylinder or the polygon, so that the radiation pattern of the antenna structure 1 can be controlled in a plurality of directions of a cross section of the columnar structure.

The following describes a cylindrical antenna structure with reference to some examples.

Example 1

Figure 6:
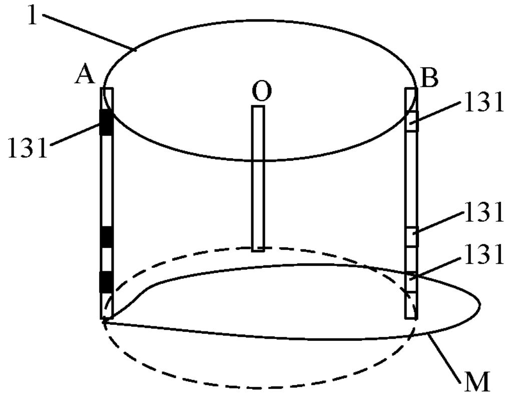
FIG. 6 is a first schematic diagram of an antenna structure in a columnar shape according to an embodiment of the present disclosure.
Figure 7:
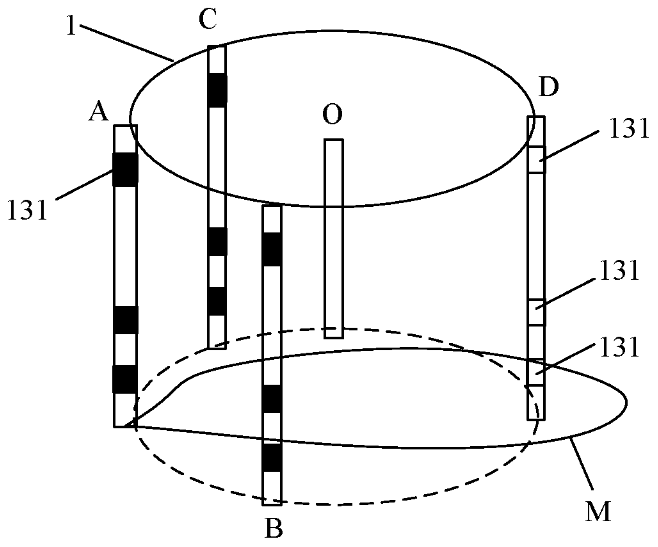
FIG. 7 is a second schematic diagram of an antenna structure in a columnar shape according to an embodiment of the present disclosure.

As shown in FIG. 6, an antenna structure 1 includes a parasitic element A, a parasitic element B, and a driven element O. The parasitic elements A and B are located on an outer peripheral surface of a cylinder, and the driven element O is located inside the cylinder (for example, the driven element O may or may not be located at the center of the cylinder).

Optionally, the parasitic elements A and B may be the same, that is, the parasitic elements A and B have a same quantity of radiating elements and a same quantity of electrical control switches, and the radiating elements of the parasitic element A and the radiating elements of the parasitic element B have same arm lengths in a one-to-one correspondence. The electrical control switches in the parasitic elements A and B can be controlled individually or together. This may facilitate synchronous adjustment of electrical lengths of the parasitic elements A and B, thereby simplifying control logic.

According to the control principle of the radiation pattern of the antenna structure shown in FIG. 2, based on control of a status of the electrical control switches, the electrical lengths of the parasitic element A, the parasitic element B, and the driven element O meet the following requirement: Electrical length of the parasitic element A>electrical length of the driven element O>electrical length of the parasitic element B. For example, switch elements 131 in the parasitic element A are all turned on (a black switch element 131 in FIG. 6 indicates a turned-on switch element), and switch elements 131 of the parasitic element B are all turned off (a white switch element 131 in FIG. 6 indicates a turned-off switch element). For adjustment of the electrical lengths of the parasitic elements based on an on state or an off state of the switch elements 131, reference may be made to the description in the foregoing embodiment. Details are not described herein. In this way, the antenna radiates in a direction toward the parasitic element B (the radiation pattern is shown by the curve in FIG. 6).

Certainly, in another case, according to the control principle of the radiation pattern of the antenna structure shown in FIG. 3, based on control of the status of the electrical control switches, the electrical lengths of the parasitic element A, the parasitic element B, and the driven element O meet the following requirement: Electrical length of the parasitic element B>electrical length of the driven element O>electrical length of the parasitic element A. In this way, an antenna effect pattern is extended toward the parasitic element A.

Example 2

As shown in FIG. 7 to FIG. 11, an antenna structure 1 includes a parasitic element A, a parasitic element B, a parasitic element C, a parasitic element D, and a driven element O. The parasitic elements A, B, C, and D are located on an outer peripheral surface of a cylinder, and the driven element O is located inside the cylinder (for example, the driven element O may be located at the center of the cylinder or not at the center of the cylinder).

Figure 8:
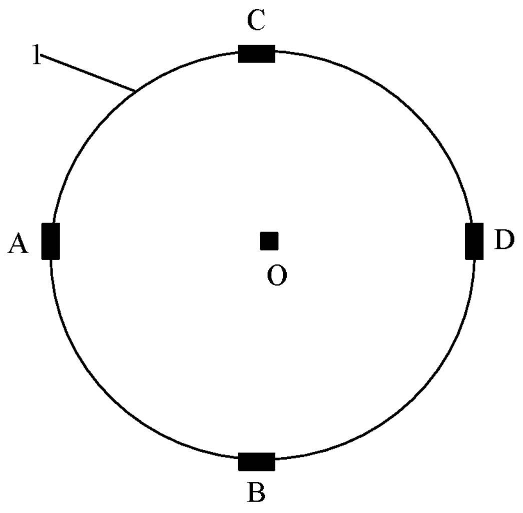
FIG. 8 is a top view of the antenna structure in FIG. 7.

In particular, as shown in FIG. 8, the parasitic elements A, B, C, and D may be uniformly arranged on the peripheral surface of the cylinder, so that when the antenna structure is disposed in a terminal and the terminal operates in a 5G mode, a case where signal strength and signal quality are blocked or antenna directivity is poor can be improved.

Optionally, the parasitic elements A, B, C, and D may be the same, that is, the parasitic elements A, B, C, and D have a same quantity of radiating elements and a same quantity of electrical control switches, and the respective radiating elements of parasitic elements A, B, C, and D have same arm lengths in a one-to-one correspondence. The electrical control switches in the parasitic elements A, B, C, and D can be controlled individually or together. This may facilitate synchronous adjustment of electrical lengths of the parasitic elements A, B, C, and D, thereby simplifying control logic.

Optionally, in the at least two parasitic elements 12, a quantity of parasitic elements serving as reflectors is greater than or equal to a quantity of parasitic elements serving as directors. In particular, when a quantity of parasitic elements 12 is greater than 2, the quantity of parasitic elements serving as reflectors is greater than the quantity of parasitic elements serving as directors.

When the quantity of parasitic elements serving as reflectors is greater than or equal to 2, one of the parasitic elements serving as reflectors is disposed adjacent to at least another one of the parasitic elements serving as reflectors. Thus, the adjacent parasitic elements serving as reflectors can form a reflective wall.

Figure 9:
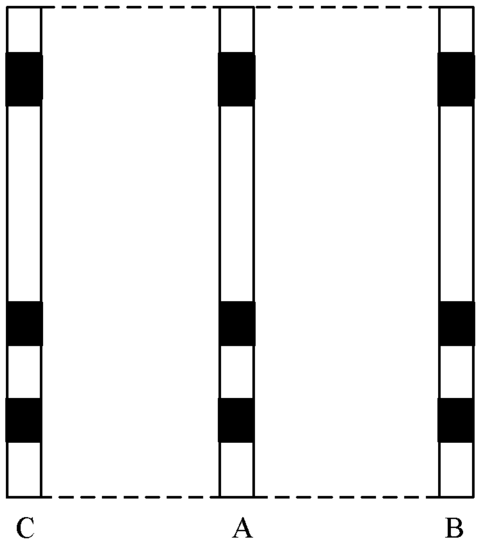
FIG. 9 is an expanded view of a reflection surface formed by parasitic elements A, B, and C in the antenna structure in FIG. 7.
Figure 10:
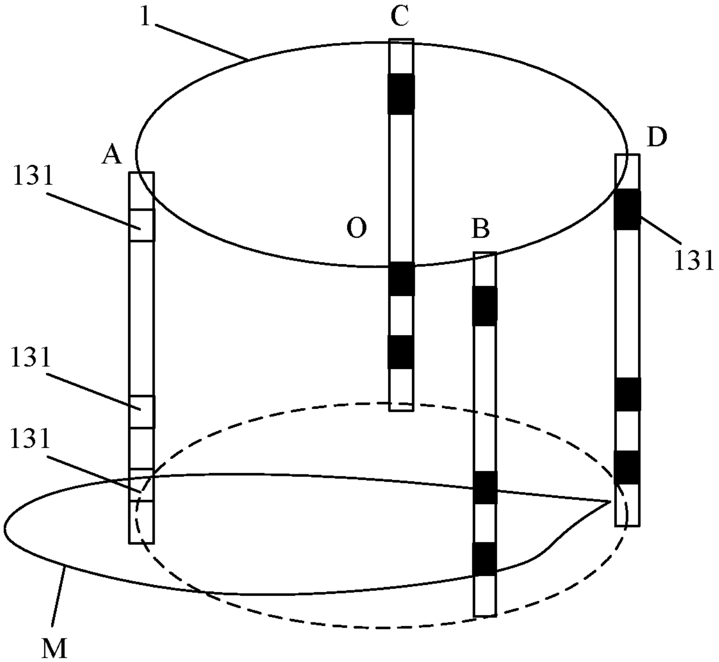
FIG. 10 is a first radiation pattern of the antenna structure in FIG. 7.

For example, if a direction of the parasitic element D with respect to the driven element O in the antenna structure 1 is a direction in which scanning is to be performed by the antenna structure 1, switch elements of the parasitic element D may be all controlled to be turned off and switch elements of the parasitic elements A, B, and C may be all controlled to be turned on. Thus, the parasitic elements A, B, and C form an element surface, as shown in FIG. 9.

For example, the switch elements of the parasitic elements A, B, and C can be synchronously adjusted, so that electrical lengths of the parasitic elements A, B, and C meet a requirement of A=B=C, and the electrical lengths of the parasitic elements A, B, and C are larger than that of the driven element O, forming a reflective wall. The switch elements of the parasitic element D are individually adjusted, so that the electrical length of the parasitic element D is less than that of the driven element O. For example, the switch elements 131 of the parasitic elements A, B and C are all turned on (a black switch element 131 in FIG. 7 indicates a turned-on switch element), and switch elements of the parasitic element B are all turned off (a white switch element 131 in FIG. 7 indicates a turned-off switch element). For adjustment of the electrical lengths of the parasitic elements based on an on state or an off state of the switch elements 131, reference may be made to the description in the foregoing embodiment. Details are not described herein. In this way, an antenna radiation pattern shown by the curve M in FIG. 7 can be obtained.

Alternatively, the switch elements of the parasitic elements B, C, and D can be synchronously adjusted, so that the electrical lengths of the parasitic elements B, C, and D meet a requirement of C=B=D, and the electrical lengths of the parasitic elements B, C, and D are larger than that of the driven element O, forming a reflective wall. The switch elements of the parasitic element A are individually adjusted, so that the electrical length of the parasitic element A is smaller than that of the driven element O. For example, the switch elements 131 of the parasitic elements B, C, and D are all turned on (a black switch element 131 in FIG. 10 indicates a turned-on switch element), and switch elements of the parasitic element B are all turned off (a white switch element 131 in FIG. 10 indicates a turned-off switch element). For adjustment of the electrical lengths of the parasitic elements based on an on state or an off state of the switch elements 131, reference may be made to the description in the foregoing embodiment. Details are not described herein. In this way, an antenna radiation pattern shown by the curve M in FIG. 10 can be obtained.

Figure 11:
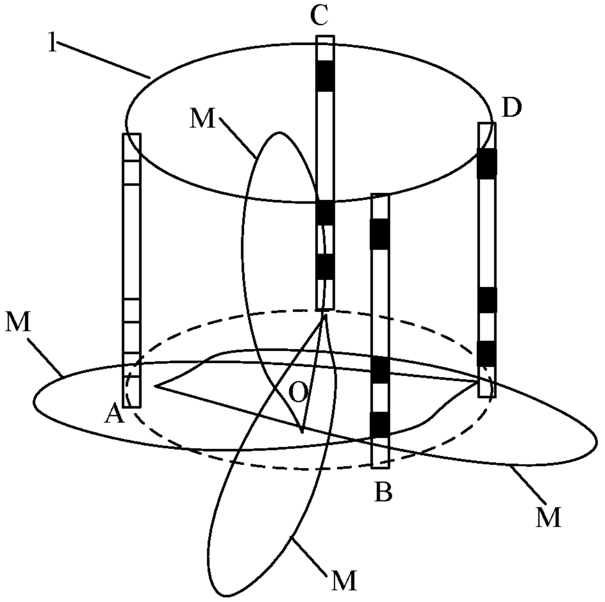
FIG. 11 is a second radiation pattern of the antenna structure in FIG. 7.

Similarly, based on the foregoing principles, the electrical lengths of the parasitic elements A, B, C, and D can be adjusted separately to obtain antenna patterns in different directions shown by curves M in FIG. 11. Details are not described herein again.

Based on the foregoing principles, the parasitic elements (a quantity of parasitic elements is not limited, for example, including 1, 2, 3, 4, 5, 6, 7, 8 . . . ) can be arranged in series, to implement a higher directivity coefficient of the overall antenna and scanning of 360 degrees in any direction. Details are not described herein.

In the foregoing solution, the parasitic elements 12 are arranged around the driven element 11, and a radiation pattern of the overall antenna can be controlled along a circumferential plane, thereby improving the directional performance of the antenna structure. The electrical length of each parasitic element 12 is controlled by electrical control switches to meet a signal propagation requirement. In this way, the parasitic elements 12 arranged around the driven element 11 can increase the directivity coefficient of the overall antenna and achieve a lower space loss.

An embodiment of the present disclosure further provides a terminal, including the foregoing antenna structure.

The antenna structure in the terminal provided in this embodiment of the present disclosure can use the solution of any one of the foregoing embodiments of the antenna structure, and can achieve a corresponding technical effect. To avoid repetition, details are not described herein.

Figure 12:
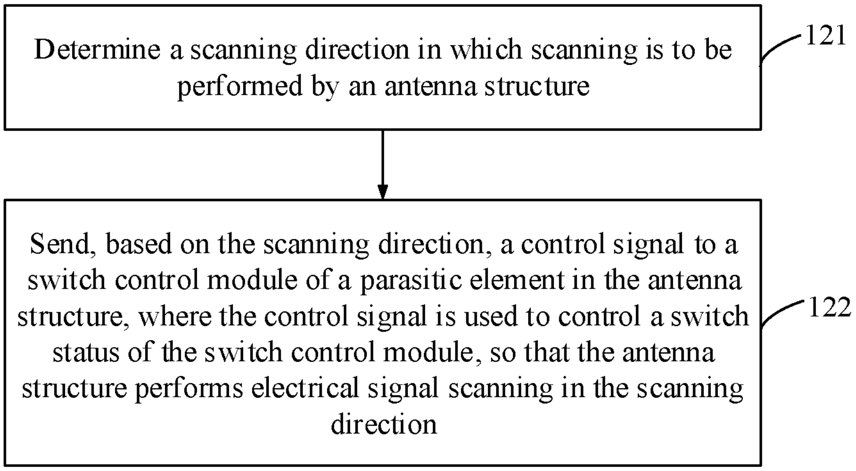
FIG. 12 is a flowchart of a control method according to an embodiment of the present disclosure.

As shown in FIG. 12, an embodiment of the present disclosure further provides a control method, applied to the foregoing terminal. The method includes:

Step 121: Determine a scanning direction in which scanning is to be performed by the antenna structure; and Step 122: Send, based on the scanning direction, a control signal to a switch control module of a parasitic element in the antenna structure, where the control signal is used to control a switch status of the switch control module, so that the antenna structure performs electrical signal scanning in the scanning direction.

The antenna structure in the foregoing embodiment may be installed inside the terminal. When the terminal operates in a 5G frequency band, a radio frequency signal is propagated via an element body. Based on electrical signal scanning implemented by using the radio frequency signal via the switch control module, a scanning direction in which scanning is to be performed by the antenna structure can be preliminarily determined, and then a switch control module (for example, an electrical control switch) in a parasitic element is adjusted, so as to adjust an electrical length of the parasitic element to meet the requirements of the scanning direction and the required frequency band, thereby propagating the radio frequency signal.

In the foregoing solution, a switch status of the switch control module is controlled by using the control signal, that is, the electrical length of the parasitic element is adjusted, so that an overall antenna radiation pattern can be controlled along a circumferential plane and adjusted in the circumferential plane, so as to meet a demand of multi-directional propagation of signals.

Figure 13:
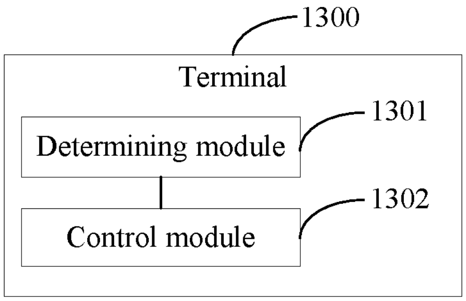
FIG. 13 is a block diagram of a terminal according to an embodiment of the present disclosure.

As shown in FIG. 13, an embodiment of the present disclosure further provides a terminal 1300, including the foregoing antenna structure. The terminal 1300 further includes:

- a determining module 1301, configured to determine a scanning direction in which scanning is to be performed by the antenna structure; and
- a control module 1302, configured to send, based on the scanning direction, a control signal to a switch control module of a parasitic element in the antenna structure, where the control signal is used to control a switch status of the switch control module, so that the antenna structure performs electrical signal scanning in the scanning direction.

The terminal provided in this embodiment of the present disclosure can implement the processes performed by the terminal in the method embodiment in FIG. 12. To avoid repetition, details are not described herein again.

The terminal 1300 in this embodiment controls the switch status of the switch control module by using the control signal, that is, an electrical length of the parasitic element is adjusted, so that a radiation pattern of the overall antenna can be controlled along a circumferential plane and adjusted in the circumferential plane, so as to meet a demand of multi-directional propagation of signals.

Figure 14:
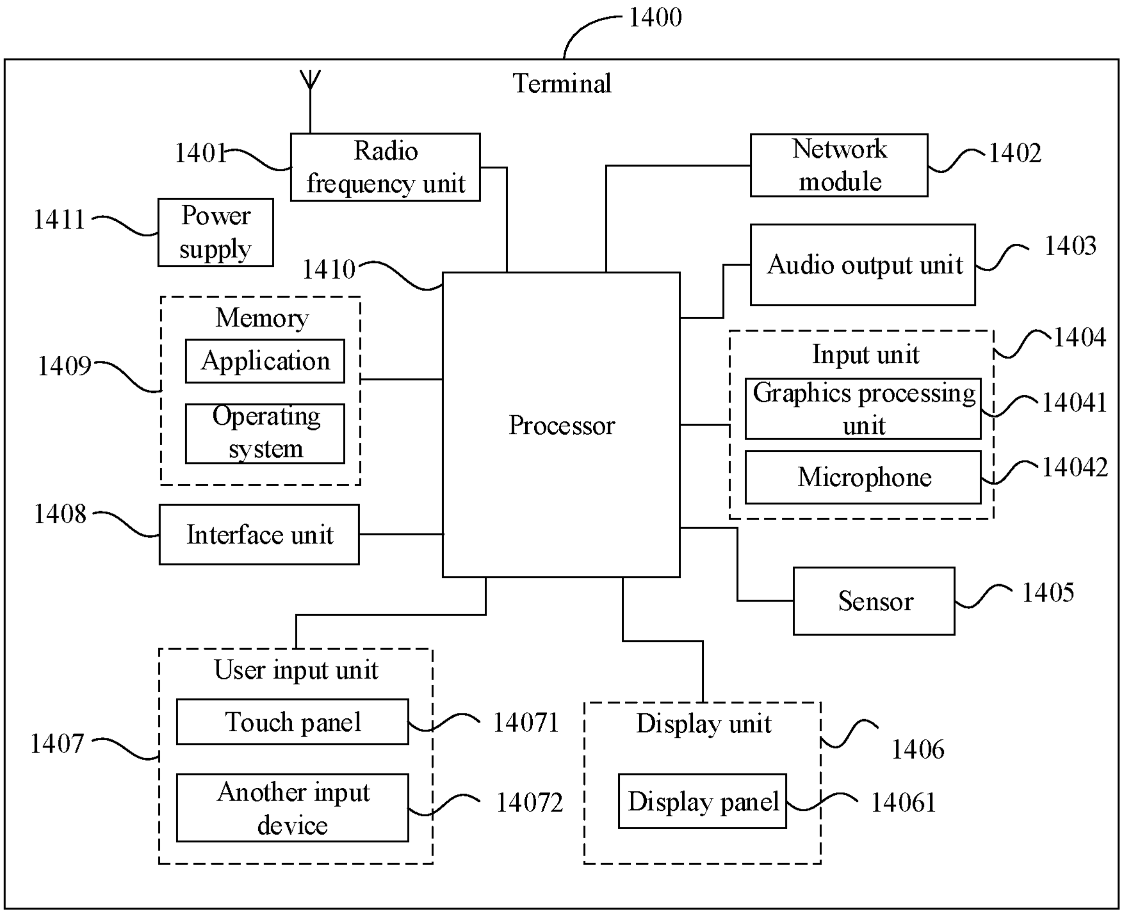
FIG. 14 is a schematic diagram of a hardware structure of a terminal according to an embodiment of the present disclosure.

FIG. 14 is a schematic diagram of a hardware structure of a terminal according to embodiments of the present disclosure.

The terminal 1400 includes, but is not limited to: a radio frequency unit 1401, a network module 1402, an audio output unit 1403, an input unit 1404, a sensor 1405, a display unit 1406, a user input unit 1407, an interface unit 1408, a memory 1409, a processor 1410, and a power supply 1411. A person skilled in the art may understand that the terminal structure shown in FIG. 14 does not constitute a limitation on the terminal. The terminal may include more or fewer components than those shown in the figure, or some components may be combined, or there may be a different component arrangement. In this embodiment of the present disclosure, the terminal includes but is not limited to a mobile phone, a tablet computer, a laptop computer, a palmtop computer, a vehicle-mounted terminal, a wearable device, and a pedometer.

The processor 1410 is configured to determine a scanning direction in which scanning is to be performed by the antenna structure; and send, based on the scanning direction, a control signal to a switch control module of a parasitic element in the antenna structure, where the control signal is used to control a switch status of the switch control module, so that the antenna structure performs electrical signal scanning in the scanning direction.

The terminal 1400 in this embodiment controls the switch status of the switch control module by using the control signal, that is, an electrical length of the parasitic element is adjusted, so that a radiation pattern of the overall antenna can be controlled along a circumferential plane and adjusted in the circumferential plane, so as to meet a demand of multi-directional propagation of signals.

It should be understood that in this embodiment of this disclosure, the radio frequency unit 1401 may be configured to receive and send information, or to receive and send a signal in a call process, for example, after receiving downlink data from a base station, send the downlink data to the processor 1410 for processing; and also send uplink data to the base station. Generally, the radio frequency unit 1401 includes, but is not limited to, an antenna, at least one amplifier, a transceiver, a coupler, a low noise amplifier, and a duplexer. In addition, the radio frequency unit 1401 may further communicate with a network and another device through a wireless communications system.

The terminal provides wireless broadband Internet access for a user by using the network module 1402, for example, helps the user to send and receive an e-mail, browse a web page, and access streaming media.

The audio output unit 1403 may convert audio data received by the radio frequency unit 1401 or the network module 1402 or stored in the memory 1409 into an audio signal, and output the audio signal into a sound. In addition, the audio output unit 1403 may further provide audio output (for example, a call signal receiving sound or a message receiving sound) related to a specific function performed by the terminal 1400. The audio output unit 1403 includes a loudspeaker, a buzzer, a receiver, and the like.

The input unit 1404 is configured to receive audio or radio signals. The input unit 1404 may include a graphics processing unit (GPU) 14041 and a microphone 14042. The graphics processing unit 14041 processes image data of a static image or a video obtained by an image capturing apparatus (for example, a camera) in a video capturing mode or an image capturing mode. A processed image frame can be displayed on the display unit 1406. An image frame processed by the graphics processing unit 14041 may be stored in the memory 1409 (or another storage medium) or sent by the radio frequency unit 1401 or the network module 1402. The microphone 14042 can receive a sound and can process the sound into audio data. The processed audio data may be converted in a call mode into a format that can be sent by the radio frequency unit 1401 to a mobile communication base station for outputting.

The terminal 1400 further includes at least one sensor 1405, for example, a light sensor, a motion sensor, and another sensor. For example, the light sensor includes an ambient light sensor and a proximity sensor. The ambient light sensor can adjust brightness of a display panel 14061 based on brightness of ambient light. The proximity sensor can turn off the display panel 14061 and/or backlight when the terminal 1400 is moved towards an ear. As a type of motion sensor, an accelerometer sensor may detect acceleration values in directions (that are generally three axes), and detect a value and a direction of gravity when the accelerometer sensor is static, and may be configured to: recognize terminal posture (for example, screen switching between landscape and portrait modes, a related game, or magnetometer posture calibration), and perform a function related to vibration recognition (for example, a pedometer or a knock), and the like. The sensor 1405 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1406 is configured to display information entered by a user or information provided for a user. The display unit 1406 may include a display panel 14061. The display panel 14061 may be configured in a form of a liquid crystal display (LCD), an organic light-emitting diode (OLED), or the like.

The user input unit 1407 may be configured to receive input digit or character information and generate key signal input related to user settings and function control of the terminal. For example, the user input unit 1407 includes a touch panel 14071 and another input device 14072. The touch panel 14071 is also referred to as a touchscreen, and may collect a touch operation performed by the user on or near the touch panel 14071 (for example, an operation performed on or near the touch panel 14071 by the user by using any appropriate object or accessory such as a finger or a stylus). The touch panel 14071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1410, and receives and executes a command sent by the processor 1410. In addition, the touch panel 14071 may be implemented in a plurality of forms, for example, as a resistive, capacitive, infrared, or surface acoustic wave touch panel. In addition to the touch panel 14071, the user input unit 1407 may further include another input device 14072. The another input device 14072 may include, but is not limited to, a physical keyboard, a functional button (such as a volume control button or a power on/off button), a trackball, a mouse, and a joystick. Details are not described herein.

The touch panel 14071 may cover the display panel 14061. When detecting the touch operation on or near the touch panel 14071, the touch panel 14071 transmits the touch operation to the processor 1410 to determine a type of a touch event, and then the processor 1410 provides corresponding visual output on the display panel 14061 based on the type of the touch event. In FIG. 14, although the touch panel 14071 and the display panel 14061 are used as two independent parts to implement input and output functions of the terminal, in some embodiments, the touch panel 14071 and the display panel 14061 may be integrated to implement the input and output functions of the terminal. This is not specifically limited herein.

The interface unit 1408 is an interface connecting an external apparatus to the terminal 1400. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1408 may be configured to receive an input (such as data information, electrical power) from the external apparatus and transmit the received input to one or more elements within the terminal 1400, or the interface unit 1408 may be configured to transmit data between the terminal 1400 and the external apparatus.

The memory 1409 may be configured to store a software program as well as every kind of data. The memory 1409 may primarily include a program storage area and a data storage area, where the program storage area may store an operating system, an application (such as a sound playing function, an image playing function) required for at least one function, and the like; and the data storage area may store data (such as audio data, a phone book) created based on the use of a mobile phone. In addition, the memory 1409 may include a high-speed random access memory, and may further include a non-volatile memory such as at least one magnetic disk storage component, a flash memory component, or another volatile solid-state storage component.

The processor 1410 is a control center of the terminal, and connects all parts of the entire terminal by using various interfaces and lines. By running or executing a software program and/or a module stored in the memory 1409 and invoking data stored in the memory 1409, the processor 1410 performs various functions of the terminal and data processing, to perform overall monitoring on the terminal. The processor 1410 may include one or more processing units. Optionally, the processor 1410 may integrate an application processor and a modem processor. The application processor mainly deals with an operating system, a user interface, and an application. The modem processor mainly deals with wireless communication. It may be understood that, alternatively, the modem processor may not be integrated into the processor 1410.

The terminal 1400 may further include the power supply 1411 (such as a battery) that supplies power to each component. Optionally, the power supply 1411 may be logically connected to the processor 1410 by using a power management system, so as to implement functions such as charging, discharging, and power consumption management by using the power management system.

In addition, the terminal 1400 includes some functional modules not shown. Details are not described herein.

Optionally, an embodiment of the present disclosure further provides a terminal, including a processor 1410, a memory 1409, and a computer program that is stored in the memory 1409 and executable on the processor 1410. When the computer program is executed by the processor 1410, each process of embodiments of the foregoing control method can be implemented, and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the foregoing processes of the photographing method embodiment are implemented, and a same technical effect can be achieved. To avoid repetition, details are not described herein again. The non-transitory computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An antenna structure, comprising a driven element and at least two parasitic elements, wherein the at least two parasitic elements are disposed around the driven element and spaced apart from the driven element; and each parasitic element is provided with a switch control module, wherein the switch control module has at least two switch statuses, and each of the switch statuses of the switch control module corresponds to one electrical length of the parasitic element;

wherein the parasitic elements and the driven element are encapsulated in a columnar structure;

the driven element is located inside the columnar structure; and some of the at least two parasitic elements are located inside the columnar structure, while other parasitic elements are located on an outer peripheral surface of the columnar structure; or all of the at least two parasitic elements are located on an outer peripheral surface of the columnar structure; or all of the at least two parasitic elements are located inside the columnar structure.

2. The antenna structure according to claim 1, wherein the switch control module comprises at least one switch element, and each of the at least two parasitic elements comprises at least two radiating elements; wherein the at least two radiating elements are sequentially connected, and each of the switch elements is disposed between every two adjacent radiating elements, wherein the switch element has an on state and an off state; and each of the switch statuses is a combination of an on state or an off state corresponding to each of the at least one switch element.

3. The antenna structure according to claim 2, wherein the at least one switch element is an electrical control switch.

4. The antenna structure according to claim 1, wherein in the at least two parasitic elements, a quantity of parasitic elements serving as reflectors is greater than or equal to a quantity of parasitic elements serving as directors.

5. The antenna structure according to claim 4, wherein when the quantity of parasitic elements serving as reflectors is greater than or equal to 2, one of the parasitic elements serving as reflectors is disposed adjacent to at least another one of the parasitic elements serving as reflectors.

6. A terminal, comprising an antenna structure, wherein the antenna structure comprises a driven element and at least two parasitic elements;

the at least two parasitic elements are disposed around the driven element and spaced apart from the driven element; and each parasitic element is provided with a switch control module, wherein the switch control module has at least two switch statuses, and each of the switch statuses of the switch control module corresponds to one electrical length of the parasitic element;

wherein the parasitic elements and the driven element are encapsulated in a columnar structure;

the driven element is located inside the columnar structure; and some of the at least two parasitic elements are located inside the columnar structure, while other parasitic elements are located on an outer peripheral surface of the columnar structure; or all of the at least two parasitic elements are located on an outer peripheral surface of the columnar structure; or all of the at least two parasitic elements are located inside the columnar structure.

7. The terminal according to claim 6, wherein the switch control module comprises at least one switch element, and each of the at least two parasitic elements comprises at least two radiating elements; wherein the at least two radiating elements are sequentially connected, and each of the switch elements is disposed between every two adjacent radiating elements, wherein the switch element has an on state and an off state; and each of the switch statuses is a combination of an on state or an off state corresponding to each of the at least one switch element.

8. The terminal according to claim 7, wherein the at least one switch element is an electrical control switch.

9. The terminal according to claim 6, wherein in the at least two parasitic elements, a quantity of parasitic elements serving as reflectors is greater than or equal to a quantity of parasitic elements serving as directors.

10. The terminal according to claim 9, wherein when the quantity of parasitic elements serving as reflectors is greater than or equal to 2, one of the parasitic elements serving as reflectors is disposed adjacent to at least another one of the parasitic elements serving as reflectors.

11. A control method, applied to the terminal according to claim 6, wherein the control method comprises:

determining a scanning direction in which scanning is to be performed by the antenna structure; and sending, based on the scanning direction, a control signal to the switch control module of a parasitic element of the at least two parasitic elements in the antenna structure, wherein the control signal is used to control a switch status of the switch control module, so that the antenna structure performs electrical signal scanning in the scanning direction.

12. A terminal, comprising a processor, a memory, and a computer program that is stored in the memory and executable on the processor, wherein when the computer program is executed by the processor, steps of the control method according to claim 11 are implemented.

* * * * *